(12) United States Patent  (10) Patent No.: US 8,879,578 B2
Matthews et al.  (45) Date of Patent: Nov. 4, 2014

(54) REDUCING STORE AND FORWARD DELAY IN DISTRIBUTED SYSTEMS

(71) Applicant: Broadcom Corporation, Irvine, CA (US)

(72) Inventors: Brad Matthews, San Jose, CA (US); Puneet Agarwal, Cupertino, CA (US); Bruce Kwan, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 137 days.

(21) Appl. No.: 13/721,989

(22) Filed: Dec. 20, 2012

(65) Prior Publication Data

US 2014/0022895 A1  Jan. 23, 2014

Related U.S. Application Data

(60) Provisional application No. 61/673,440, filed on Jul. 19, 2012.

(51) Int. Cl.
 *H04J 3/16* (2006.01)
 *H04L 12/801* (2013.01)

(52) U.S. Cl.
 CPC .................................... *H04L 47/12* (2013.01)
 USPC ........... 370/468; 370/389; 370/392; 370/229; 370/413

(58) Field of Classification Search
 None
 See application file for complete search history.

(56) References Cited

U.S. PATENT DOCUMENTS

| | | | |
|---|---|---|---|
| 7,596,086 B2 * | 9/2009 | Wang et al. | 370/230 |
| 7,869,356 B2 | 1/2011 | Dodson et al. | |
| 8,289,966 B1 * | 10/2012 | Fricke et al. | 370/392 |
| RE44,119 E * | 4/2013 | Wang et al. | 370/230 |
| 8,761,166 B2 * | 6/2014 | Scott et al. | 370/389 |
| 2009/0154459 A1 * | 6/2009 | Husak et al. | 370/390 |

OTHER PUBLICATIONS

Product Brief, PEX 8649, PCI Express Gen 2 Switch, 48 Lanes, 12 Ports, PLX Technology, Version 1.1, May 14, 2009.

* cited by examiner

*Primary Examiner* — Duc C Ho

(74) *Attorney, Agent, or Firm* — Brinks Gilson & Lione

(57) ABSTRACT

Processing techniques in a network switch help reduce latency in the delivery of data packets to a recipient. The processing techniques include speculative flow status messaging, for example. The speculative flow status messaging may alert an egress tile or output port of an incoming packet before the incoming packet is fully received. The processing techniques may also include implementing a separate accelerated credit pool which provides controlled push capability for the ingress tile or input port to send packets to the egress tile or output port without waiting for a bandwidth credit from the egress tile or output port.

20 Claims, 7 Drawing Sheets

REDUCING STORE AND FORWARD DELAY IN DISTRIBUTED SYSTEMS

1. PRIORITY CLAIM

This application claims priority to U.S. Provisional Application Ser. No. 61/673,440, filed 19 Jul. 2012, which is incorporated herein by reference in its entirety.

2. TECHNICAL FIELD

This disclosure relates networking. This disclosure also relates to reducing store and forward packet delay in network devices.

3. BACKGROUND

High speed data networks form part of the backbone of what has become indispensable data connectivity worldwide. Within the data networks, packet switching devices direct data packets from source ports to destination ports, helping to eventually guide the data packets to their correct recipient. In virtually all instances, low latency is desirable for the delivery of the data packets to the recipient. Even when a small percentage of potential recipients are affected by latency issues, the immense number of potential recipients means that a significant number experience the latency issues. Improvements in packet switching devices and experienced latency will help improve such high speed data networks.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1:
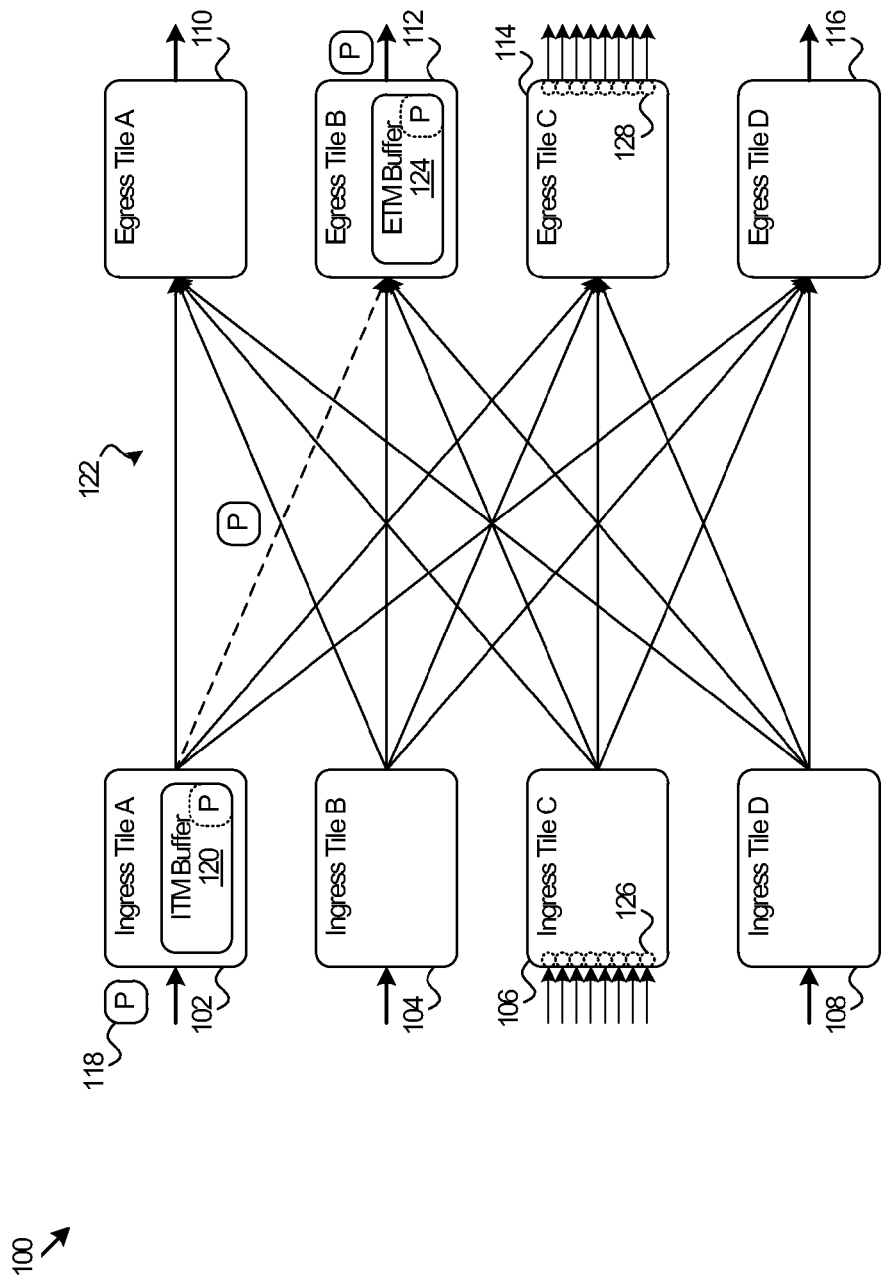
FIG. 1 shows an example of a switch architecture that switches a packet from an ingress tile to an egress tile.

FIG. 1 shows an example of a switch architecture 100, switching a packet from an ingress tile to an egress tile. In the example 100, the switch architecture 100 includes several ingress tiles, e.g., the ingress tiles 102, 104, 106, and 108 and several egress tiles, e.g., the egress tiles 110, 112, 114, and 116. A switch fabric 122 connects the ingress tiles 102-108 and the egress tiles 110-116. As shown in FIG. 1, a packet 118 arrives at an input port of the ingress tile A 102 and is buffered in an ingress traffic management (ITM) buffer 120. Under control of the switch architecture 100, the packet 118 flows through the switching fabric 122 and into the egress traffic management (ETM) buffer 124 in the egress tile B 112. The egress tile B 112 sends the packet 118 to a further destination through an output port of the egress tile B 112.

As will be explained in more detail below, the switch architecture 100 reduces the control loop delay in the packet traffic flow between the input ports and the output ports. The reduction in control loop delay is accompanied by a reduction in latency experienced by the applications receiving the packet traffic flow. Different approaches at reducing the control loop delay and reducing latency will be addressed.

The switch architecture 100 shown in FIG. 1 is an unfolded view. For example, each ingress tile and egress tile may be implemented as a unit (e.g., on a single die or system on a chip), as opposed to physically separate units. Each tile may handle multiple ports, any of which may be configured to be input only, output only, or bi-directional. Thus, each tile may be locally responsible for the reception, queueing, processing, and transmission of packets received and sent over the ports associated with that tile.

As an example, in FIG. 1 the ingress tile C 106 includes 8 ports, one of which is labeled port 126, and the egress tile C includes the same 8 ports, another one of which is labeled 128. Each port may provide a physical interface to other networks or devices, such as through a physical network cable (e.g., an Ethernet cable). Furthermore, each port may have its own line rate (i.e., the rate at which packets and received and sent on the physical interface). For example, the line rates may be 10 Mbps, 100 Mbps, 1 Gbps, or any other line rate. In the example of FIG. 1, assuming 1 Gbps line rate, 8 ports per tile and 4 tiles, the switch architecture would have an aggregate bandwidth of 32 Gbps. The techniques described below, however, are not limited to any particular configuration of line rate, number of ports, or number of tiles.

Figure 2:
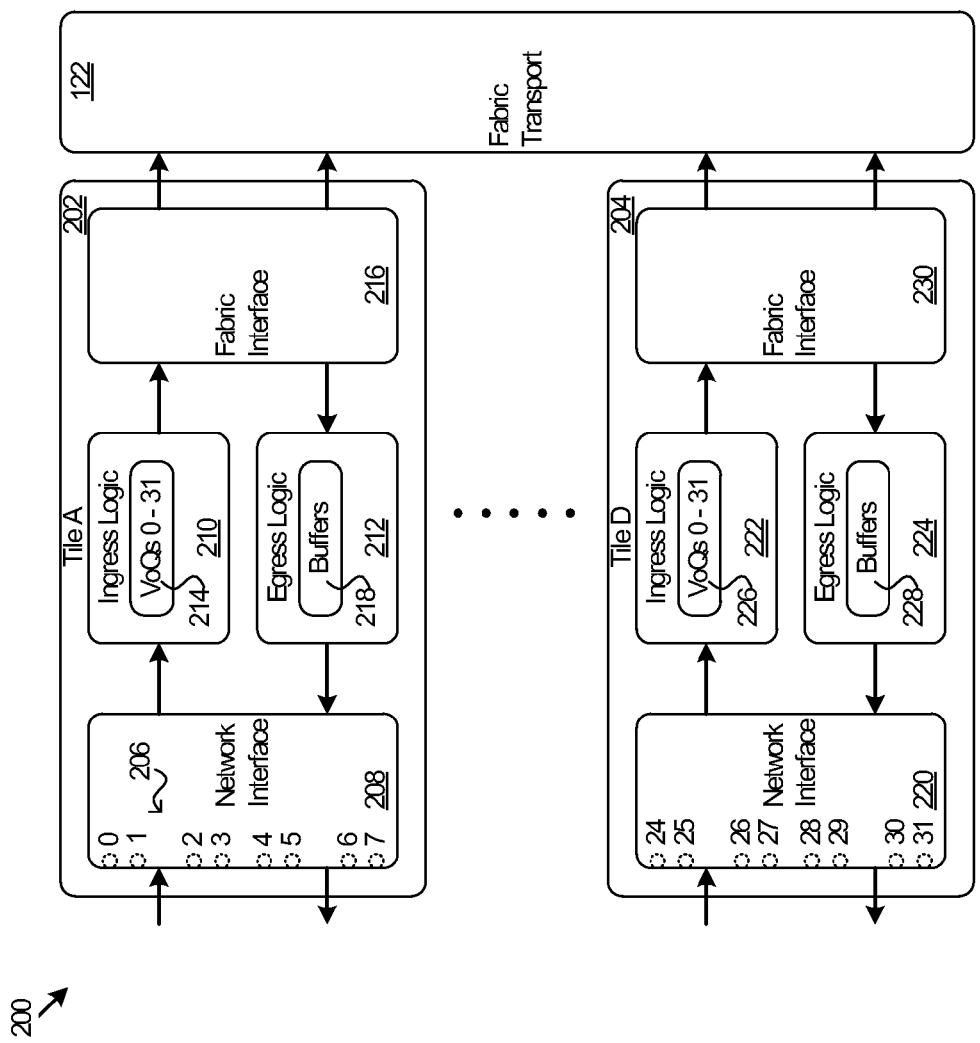
FIG. 2 is an example of a switch architecture including ingress tiles and egress tiles.

FIG. 2 shows an example switch architecture 200 in which the tiles are folded back to show that each tile may include both ingress 210 and egress logic 212. In particular, the switch architecture 200 includes one or more tiles, such as the tile 202 and the tile 204. Each tile many handle multiple (e.g., 8) individual physical ports 206. In the example in FIG. 2, tile A 202 handles ports 0 through 7 and tile D 204 handles ports 24 through 31. The ports connect to other networks or devices through the network interface 208 (e.g., a 1 Gbps Ethernet interface for each port).

The tiles include packet processing logic, which may include the ingress logic 210, the egress logic 212, and other logic. The ingress logic 210 processes incoming packets, including buffering the incoming packets by storing the packets in memory. The ingress logic 210 may define, for example, virtual output queues 214 (VOQs) in the memory, by which the ingress logic 210 maintains one or more queues in the memory assigned to or linked to each output port. The ingress logic 210 maps incoming packets from input ports to output ports, and determines in which VOQ to store the incoming packet. The mapping may include, as examples, analyzing addressee information in the packet headers, and performing a lookup in a mapping table that matches addressee information to output port(s).

The egress logic 212 may maintain one or more output buffers 218 for one or more of the ports in tile A 202. The egress logic in any tile may monitor the output buffers for congestion. When egress logic senses congestion (e.g., when any particular output buffer for any particular port is within a threshold of reaching capacity), the egress logic may throttle back its rate of granting bandwidth credit to the ingress logic in any tile for bandwidth of the congested output port. The ingress logic responds by reducing the rate at which packets are sent to the egress logic, and therefore to the output ports associated with the congested output buffers.

Tile D 204 may be implemented in the same manner as tile A 202. Thus, tile D 204 includes a network interface 220 as well as ingress logic 222 and egress logic 224. The ingress logic 222 may define and maintain VOQs 226 (e.g., one for each port in the architecture 200), while the egress logic 224 may maintain output buffers 228 (e.g., one for each output port in tile D 204). Similarly, the tile D 204 includes a fabric interface 230 for sending and receiving data on the switching fabric 122.

The ingress logic 210 also responds to credit messages, which may original from the egress logic 212. The credit messages may specify bandwidth credit that permits the ingress logic 212 to consume a specific amount of bandwidth to communicate packets to a specified output port. The credit messages are typically communicated before packets are forwarded in full to the output ports. However, as will also be explained below, the ingress logic 210 may send received packets to an output port when a special type of credit referred to as accelerated credits are available. The accelerated credits may be allocated to any desired ingress logic or VOQs in advance from, for example, a system credit pool. The ingress logic 210 may send packets and consume accelerated credit despite that insufficient bandwidth credit has been received from an output port (via credit messages) to forward the packet to the destination.

One aspect of the switch architecture 200 is a store and forward approach to packet handling. In this approach, the incoming packets are saved in a buffer, and the approach then arbitrates access to output port bandwidth for forwarding the incoming packets through the switch fabric 122, to the output port, and out of the switch. The switch fabric 122 may be a fully connected mesh transport, or other point to point interconnection, that connects each ingress tile to each egress tile. However, other switch fabrics 112 may also be used. The fabric interface 216 implements the input/output logic to send packets onto the switch fabric 122 to a destination and receive packets from the switch fabric 122.

In the store and forward approach, the ingress logic 210 may fully receive and save each incoming packet in a buffer before forwarding the received packet to its output port. For example, assume a packet has arrived on port 0, handled by the tile A 202, to depart from port 31, handled by the tile D 204. The ingress logic 210 beings to buffer the packet in a VOQ in tile A 202 for port 31. The ingress logic 210 sends a flow status message to the egress logic 224 in tile D 204 that specifies that the tile A 202 has data for the output port 31. The flow status message may act as a bandwidth credit request from the output port. The bandwidth credit is for access to the outgoing bandwidth of the output port. The egress logic 224 arbitrates among its output ports (e.g., according to a predetermined port scheduling technique) and determines whether and how much bandwidth credit to issue to the ingress logic 210 for each port, including the output port 31.

When the egress logic 224 issues bandwidth credit, the egress logic 224 sends a credit message to the ingress logic 210. The credit message specifies the bandwidth credit that the ingress logic 210 has available to send data to the output port 31 across the switch fabric 122. Once the ingress logic 210 has accumulated enough bandwidth credits to cover the amount of data in the fully enqueued packet, the ingress logic 210 sends the packet through the switch fabric 122 to the egress logic 224. The egress logic 224 may buffer or otherwise process the packet before sending the packet out of port 31.

The flow status messages and bandwidth credit messages may be communicated in-band over the switch fabric 122. Alternatively, the flow status messages and bandwidth credit messages may travel over a separate command and control bus that is physically separate from the switch fabric 122.

A tile may generate bandwidth credits at any desired rate. For example, for a tile with 4 output ports operating a line rate of 10 Gbps each, the egress logic in the tile may generate credits at a nominal rate of 40 Gbps, allocated as 10 Gbps of bandwidth credit per port. A bandwidth credit may be worth any predetermined number of bytes of bandwidth of an output port. For example, one credit may correspond to 512 bytes of bandwidth. To take an example of a packet of length of 2000 bytes, the ingress logic for the VOQ that holds the packet would accumulate at least four credits from the egress logic that handles the destination port for the packet, prior to sending the full packet to the egress logic.

The switch architecture may generate bandwidth credits at any rate, for example a rate that matches the aggregate bandwidth of the switch architecture. For example, assuming that one bandwidth credit is worth 512 bytes, and that one credit is allowed to be generated every four clock cycles of a 250 MHz clock, then the credit rate allows packets to flow at a rate of $(512*8)*(250\times10^6)/4=256$ Gbps. The nominal number of credits consumed per second is then $(250\times10^6)/4=62.5$ million credits per second. The system credit pool for a nominal traffic flow of 256 Gbps may then be 62.5 million credits.

There is a certain amount of overhead involved with the reception and forwarding process. Part of the overhead includes a control loop delay. The control loop delay is incurred, for example, when the ingress logic has zero or negative credits for the bandwidth of an output port that is the destination for a queued packet. The control loop delay may include, as example components: 1) the time for the ingress logic to generate a flow status message; 2) the time for the ingress logic to transmit the flow status message to the egress logic; 3) the time for the egress logic to receive and process the flow status message; 4) the time for the egress logic to arbitrate among its ports, determine how much bandwidth credit to give, and send a bandwidth credit message that specifies the bandwidth credit; 5) the time for the egress logic to send the bandwidth credit message to the ingress logic; and 6) the time for the ingress logic to receive and process the bandwidth credit message.

Figure 3:
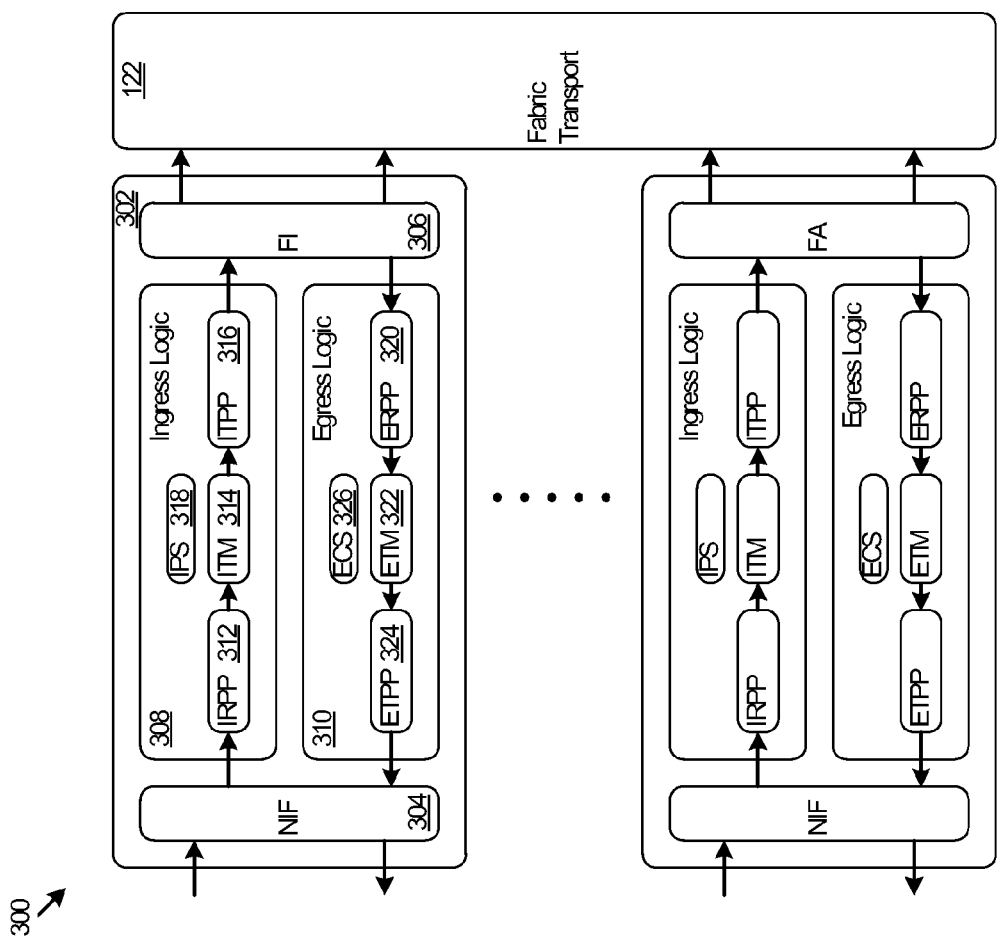
FIG. 3 is another example of a switch architecture including ingress tiles and egress tiles.

Before addressing techniques to reduce the experienced control loop delay and reduce latency, a further example of a switch architecture 300 is shown in FIG. 3. The switch architecture 300 includes tiles, such as the tile 302, connected to a switch fabric 122. Each tile includes a network interface 304, a fabric interface 306, ingress logic 308, and egress logic 310.

The ingress logic 308 receives packets arriving at the tile 302 through the network interface 304. In the ingress logic 308, the ingress receive packet processor (IRPP) 312 performs link-layer processing, tunnel termination, forwarding, filtering, and other packet processing functions on the received packets. The packets then flow to the ingress traffic manager (ITM) 314. The ITM 314 writes the packet data to a buffer, from which the ITM 314 may decide whether to accept or reject the packet. The ITM 314 associates accepted packets to a specific VOQ, e.g., for a particular output port. There may be more than one VOQ per output port, with each VOQ holding packets of any particular characteristic, such as output port, class of service (COS), priority, packet type, or other characteristic.

The ITM 314, upon linking the packet to a VOQ, generates an enqueue report. The ITM 314 may send the enqueue report to the ingress packet scheduler (IPS) 318. The enqueue report may include the VOQ number, queue size, and other information. The ITM 314 may further determine whether a received packet should be placed on a cut-through path or on a store and forward path. If the receive packet should be on a cut-through path, then the ITM 314 may send the packet directly to an output port with as low latency as possible as unscheduled traffic, and without waiting for or checking for any available bandwidth credit for the output port.

For store and forward traffic, the ITM 314 may perform packet enqueueing functions such as storing packets in an internal packet buffer, linking packets to queues, and generating enqueue Reports. The ITM 314 may also perform packet dequeueing functions, such as retrieving packets from memory, forwarding the packets to the destination egress tiles, and issuing dequeue reports. The ITM 314 may also perform buffer management, such as admission control, maintaining queue and device statistics, triggering flow control, and other management functions.

In the egress logic 310, packets arrive via the fabric interface 306. The egress receive packet processor (ERPP) 320 may write the received packets into a buffer (e.g., a queue for an output port through which the packet will exit) in the egress traffic manager (ETM) 322. Packets are scheduled for transmission and pass through the egress transmit packet processor (ETPP) 324 and ultimately out of the output ports. The ingress transmit packet processor (ITPP) 316 and the ETPP 324 may perform any desired packet processing functions. As examples, the ITPP 316 and the ETPP 324 may perform route identification, packet editing (including tagging), and other functions.

The ETM 322 may perform, as examples: egress packet reassembly, through which incoming cells that arrive interleaved from multiple source tiles are reassembled according to source tile contexts that are maintained for reassembly purposes; egress multicast replication, through which the egress tile supports packet replication to physical and logical ports at the egress tile; and buffer management, through which, prior to enqueueing the packet, admission control tests are performed based on resource utilization (i.e., buffer and packet descriptors). The ETM 322 may also perform packet enqueue/dequeue, by processing enqueue requests coming from the ERPP 320 to store incoming frames into per egress port class of service (COS) queues prior to transmission (there may be any number of such COS queues, such as 2, 4, or 8) per output port.

The ETM 322 may also include an egress packet scheduler to determine packet dequeue events, resulting in packets flowing from the ETM 322 to the ETPP 324. The ETM 322 may also perform egress packet scheduling by arbitrating across the outgoing ports and COS queues handled by the tile, to select packets for transmission; flow control of egress credit scheduler (ECS) 326, by which, based on total egress tile, per egress port, and per egress port and queue buffer utilization, flow control is sent to the ECS 326 to adjust the rate of transmission of credit grants (e.g., by implementing an ON/OFF type of control over credit grants); flow control of tile fabric data receive, through which, based on total ETM 322 buffer utilization, link level flow control is sent to the fabric interface 306 to cease sending any traffic to the ETM 322.

The IPS 318 processes the enqueue reports that it receives and updates a queue descriptor database with the new VOQ size. The queue descriptor database also maintains a credit balance and the credit request state (CRS) for the VOQ. The credit balance may represent the approximate number of bytes that a VOQ can transmit from an output port. The CRS may specify a rate at which the IPS 318 should receive credit grant messages from an ECS 326. Queue status messages may be transmitted to the ECS 326 if the CRS has changed. The CRS may be based on an evaluation of the credit balance and the VOQ size. The CRSs may include: OFF—the queue should not receive additional bandwidth credits; SLOW— send bandwidth credits at a predefined first rate, e.g., a 'slow' rate; and NORMAL—send bandwidth credits at a predefined second rate, e.g., a 'normal' rate that is faster than 'slow'. The queue status messages may be sent by the IPS 318 to any tile over the switch fabric 122.

One approach at reducing the control loop delay involves a type of speculative messaging. As packets arrive, the ingress logic divides the packets into cells (e.g., 256 bytes in size). Cells are written into buffers (e.g., in round robin manner across the input ports) in the ingress logic as they arrive across all the ports handled by that particular tile.

Packets typically include a header and a payload. As the packet size increases, so does the time required to fully receive the packet. In general, the time required to receive a complete packet is equal to the packet size divided by the port speed. As a specific example assuming, a 9 Kbyte packet takes approximately 7 ms to arrive on a 10 Mbps port. Rather than waiting for the entire packet to arrive, the ingress logic may instead analyze the header information (that is typically received first) to determine an output port for the packet that is yet to fully arrive. The ingress logic may determine the output port by analyzing addressee information in the header, to determine MAC address, IP address, or other addressee information, and then map the addressee information to an output port.

Once the destination (e.g., output port) is ascertained, the ingress logic may then send a flow status message to the corresponding tile that manages the output port. As noted above, the flow status message requests bandwidth credit from the output port. In other words, the ingress logic may send the flow status message prior to receiving the full packet, once the header information reveals the destination for the packet. Typically, the ingress logic does not forward the packet to the output port until the full packet is received. But, by sending the flow status message before fully receiving the packet, the ingress logic may hide all or some of the control loop delay because the control loop delay overlaps with the receipt of the packet payload. Accordingly, by the time that the packet payload is received, and the packet is eligible for transfer, the control loop may have fully or partially executed.

The technique is speculative in the sense that it assumes the packet will be successfully received. If the packet drops, then the egress logic may have issued bandwidth credit where there is no successfully received packet to send. One way to address this is to have the egress logic issue bandwidth credits at a rate that is higher than the port rate. Doing so may result in contention at an egress tile, and the contention may be addressed by dropping packets when there is contention, by providing flow control between the egress tile and the ingress tile, or in other ways, until the contention is alleviated. The flow control may happen in different ways. As one example, the flow control may reduce the rate of bandwidth credit issuance from the egress tile to the ingress tile. As another example, the egress tile may instruct the ingress tile to stop transmitting immediately, independently of the number of credits the ingress tile may have.

Figure 4:
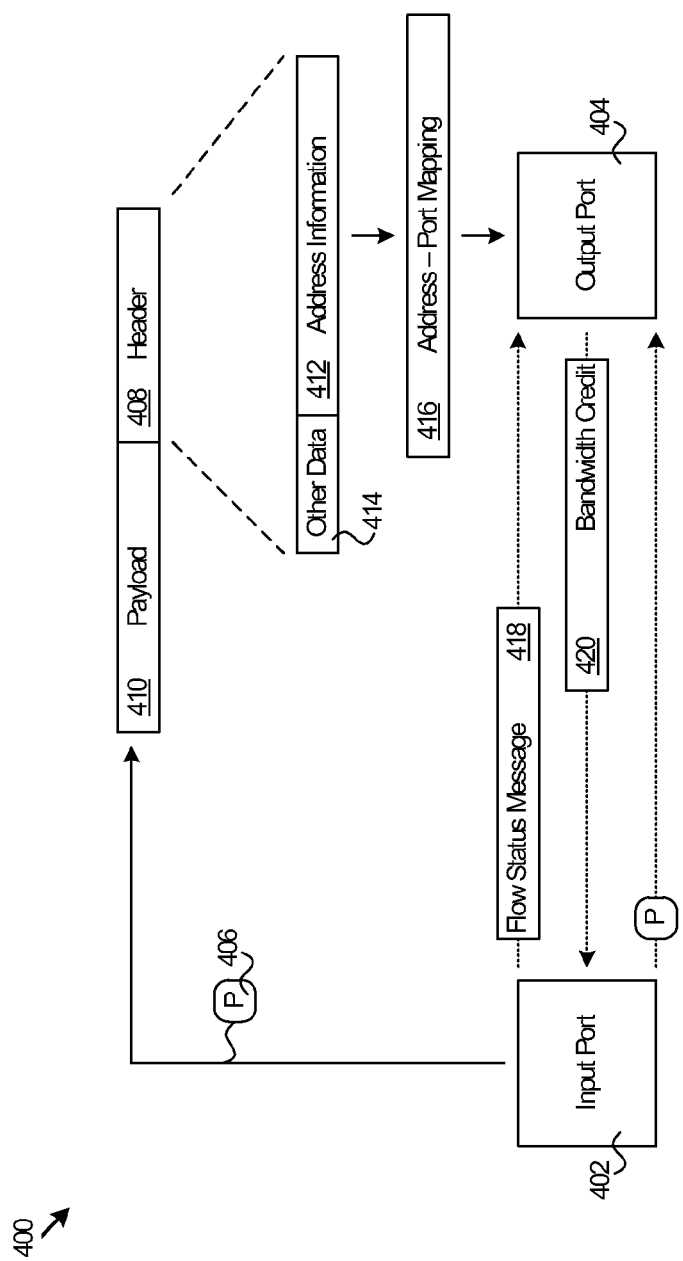
FIG. 4 is an example of message flow from an input port to an output port.

FIG. 4 is an example of speculative message flow 400 from an input port 402 to an output port 404. A packet 406 begins to arrive. The packet 406 includes a header 408 (e.g., an Ethernet packet header) and a payload 410. Typically, the header arrives before the payload, and the ingress logic may analyze the header in advance of receiving the full packet, and determine that the packet is destined for the output port 404.

In particular, the header includes address information 412 and other data 414. The address information 412 may include a destination address, source address, or other address information. The ingress logic may determine the destination port, e.g., the output port 404, by mapping the address information to a port number using a lookup table or other mapping 416.

The ingress logic determines the destination for the packet. The destination may be determined at the port level, e.g., the specific output port 404, or at a higher level, such as the tile to which the packet should be sent. The ingress logic may determine the destination port as soon as the relevant address information has been received, or after the full header has been received. In many cases, the address or header information will be available before the full packet, including the payload, is received.

As a result, prior to receiving the full packet, the ingress logic may send a flow status message 418 to the tile managing the output port 404. The flow status message 418 indicates to the tile that a packet has been received for the output port 404 (even though the packet is not yet fully received). The flow status message may further act as a request for bandwidth credit for bandwidth of the output port 404. The egress logic arbitrates among its output ports and issues a bandwidth credit message 420 to the ingress logic.

When the ingress logic accumulates bandwidth credit, and when sufficient credit has been received, the ingress logic sends the packet to the egress logic in the tile handling the output port 404. While the control loop is executing to obtain bandwidth credit, the remained of the packet is arriving. Accordingly, the bandwidth credit may in many situations be obtained at or before the time the entire packet has been received and is available to send to the output port 404. In these situations, the control loop delay has been effectively absorbed, and is not experienced as additional latency (e.g., in addition to receiving and processing the packet itself) by the entity receiving the packet.

Figure 5:
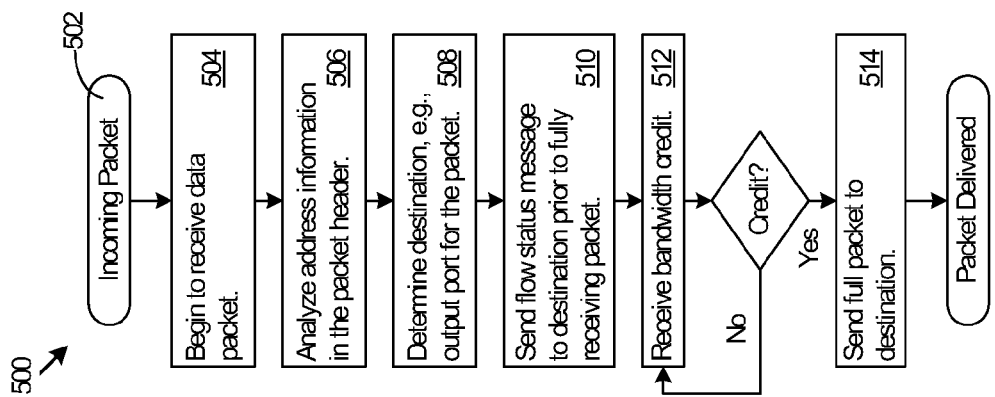
FIG. 5 shows an example logic diagram for speculative flow status messaging.

FIG. 5 shows a logic diagram 500 for speculative flow status messaging. The logic shown in FIG. 5 may be implemented in hardware or software in a switch, such as in the ingress logic described above. An incoming packet begins to arrive (502), with the header information generally arriving first. The logic begins to receive the packet (504). The logic also analyzes address information in the packet header, for example as that information becomes available, or after full reception of the header (506).

From the address information, the logic determines a destination for the packet (508). The destination may be a specific output port, a tile, or another destination. After determining the destination and prior to receiving the payload in full, the logic sends a flow status message to the destination (510). The flow status message may specify availability of the data packet for the destination, though the packet has not yet been fully received.

On the receive side, the logic may store the data packet in an input buffer prior to sending the data packet to the destination. The logic may also associate the data packet in the input buffer with a virtual output queue (VoQ) according to destination, COS, or other characteristic. The flow status message may specify the VOQ, so that the destination (and, as a particular example, the egress logic in a tile) knows for which destination the packet is intended.

The logic awaits sufficient bandwidth credit from the destination in order to send the packet to the destination. Accordingly, the logic receives bandwidth credit messages from the destination (512) that are responsive to (e.g., are caused by or result from) the flow status message. When enough bandwidth credit has been accumulated to cover the full packet size, the logic sends the full packet to the destination (514). In some communication modes, the logic may send portions (e.g., cells) of the packet to the destination as they are received, rather than await reception of the entire packet before sending the packet to the destination.

As noted above, the destination may issue bandwidth credit at an accelerated credit rate that is greater than line bandwidth of the destination. The accelerated credit rate may be set according to the expected percentage of dropped packets, in order to compensate for the speculative nature of the flow status messages. In other words, the accelerated credit rate may be set, for example, to keep data flowing out of the destination at the nominal line rate.

The destination may monitor for congestion. For example, the egress logic may monitor an output port buffer associated with the output port for congestion. When congestion is detected, the destination may reduce the accelerated credit rate to a lower credit rate that alleviates the congestion.

Figure 6:
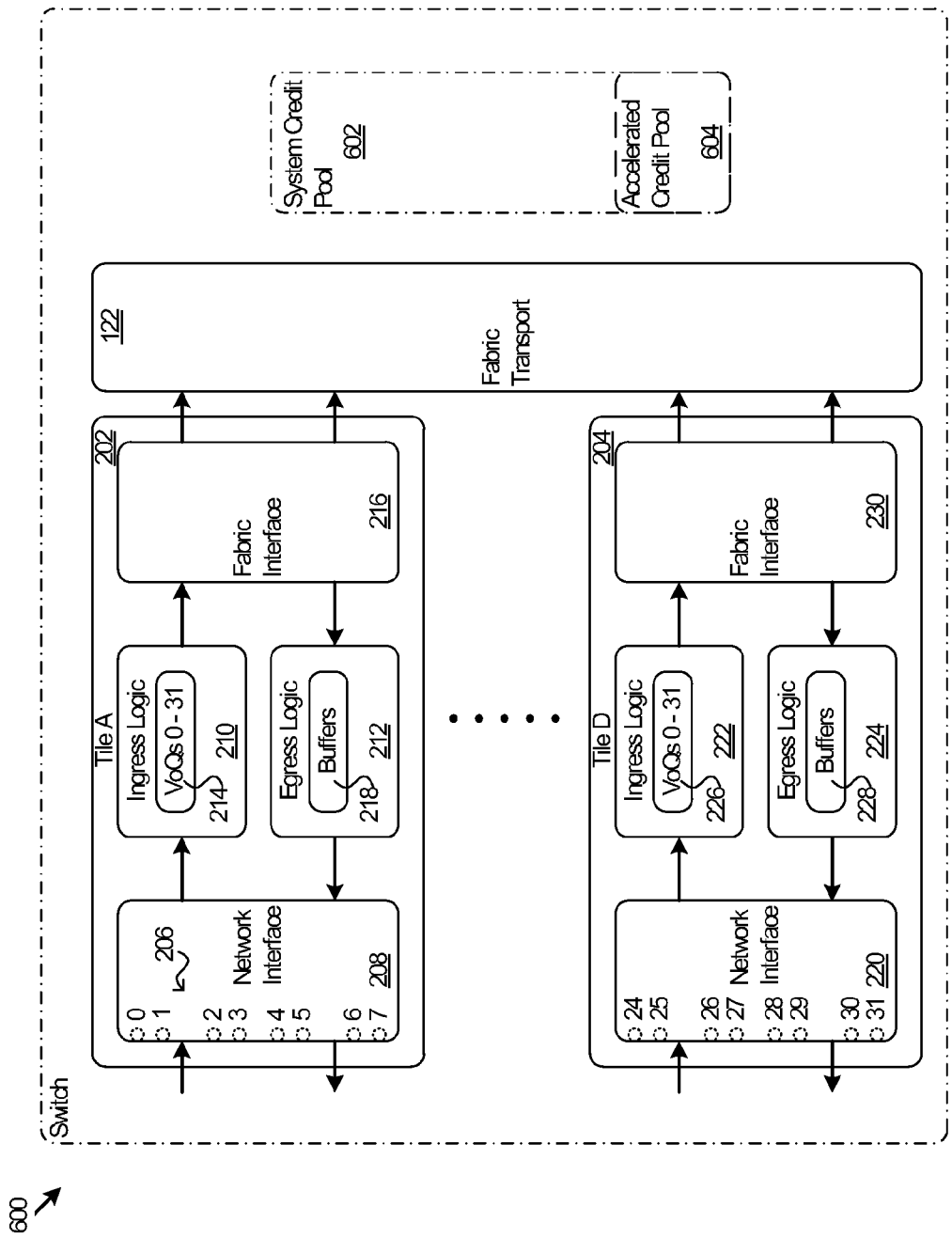
FIG. 6 shows an example switch architecture.

Another approach at reducing experienced latency involves a low delay or accelerated credit pool. FIG. 6 shows an example switch architecture 600. The architecture 600 shows that there is a system credit pool 602. From the system credit pool, the architecture 600 has allocated a certain percentage of accelerated credits 604. The percentage of accelerated credits may be a system configurable parameter, and just as a few examples, may be 5%-20% of the total system credits. The system credit pool 602 represents the maximum amount of credits that the architecture allows to be available. The system credit pool 602 may include the number of credits that would result in the architecture 600 reaching the aggregate bandwidth of the switch.

In other words, the accelerated credit pool 604 contains a fraction of the total credits in system. The architecture 600 may allocate accelerated credits in the accelerated credit pool 604 to specific output ports, specific tiles, to one or more groups of tiles, or to the architecture as a whole (e.g., a global pool), as examples. The accelerated credits may be considered and treated as pre-allocated bandwidth credits. They have been pre-granted without incurring the control loop delay.

When a network flow begins, the associated VOQ credit balance will ordinarily be zero or negative. Accordingly, flow status messages are sent to request bandwidth credit in order to start directing network flow to the destination. However, when accelerated credits are available for the destination (e.g., for the specific output port or for a tile that handles the output port), then the architecture 600 may consume accelerated credits instead, and immediately send the packet to the destination. At the same time (as possibly as soon as the destination is known from the header), the architecture 600 may start the control loop to obtain additional system credits, but the architecture 600 need not incur the latency for the control loop to complete prior to starting the network flow.

The accelerated credit pool 604 may be replenished in different manners. For example, as a particular traffic flow finishes for a destination, the architecture 600 may refill the accelerated credit pool for that destination. Furthermore, when system bandwidth credits are received from a destination, the architecture 600 may refill the accelerated credit pool with those system credits, or a portion of those system credits.

Figure 7:
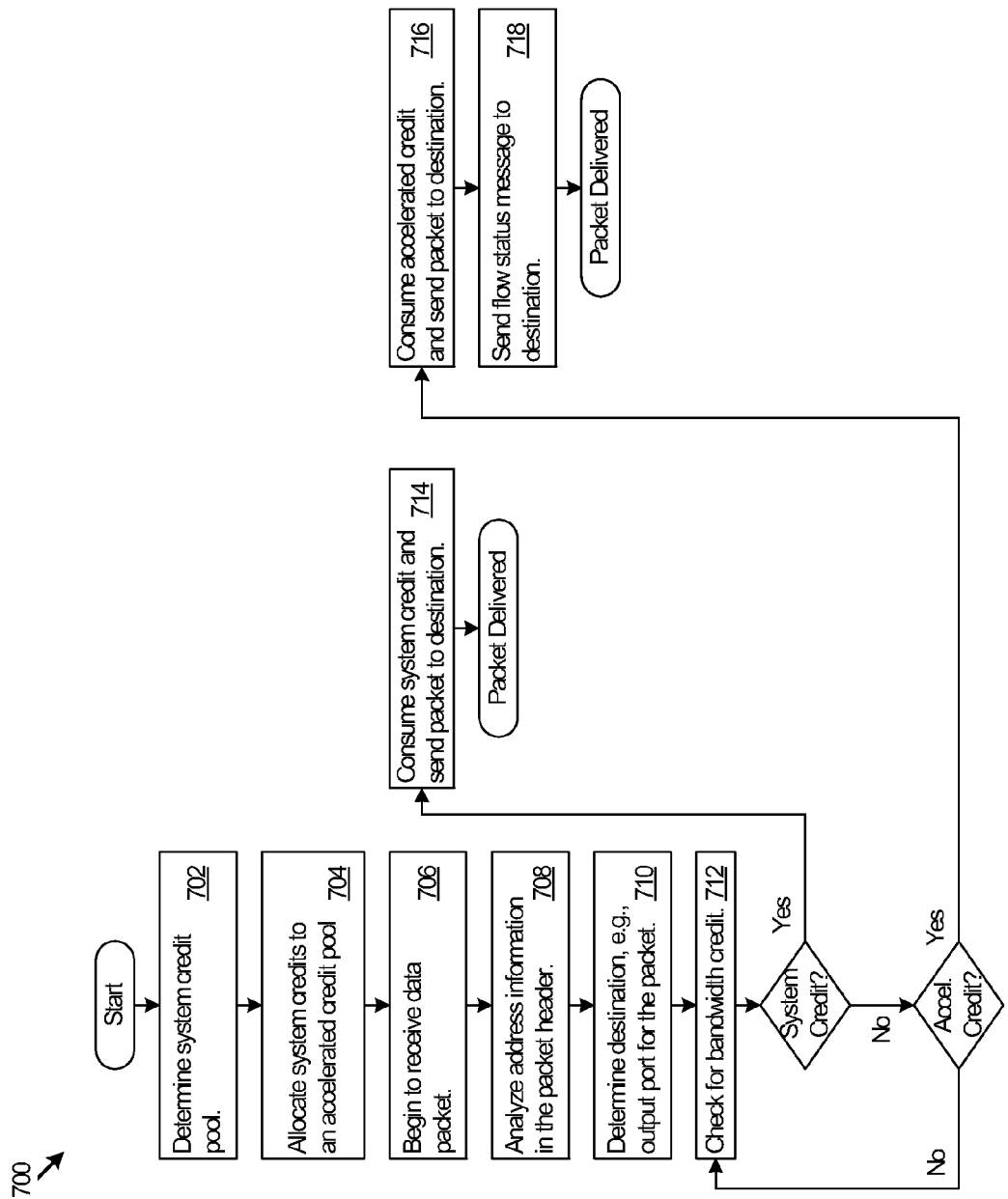
FIG. 7 shows an example logic diagram for accelerated bandwidth credit grants.

FIG. 7 shows an example logic diagram 700 for accelerated bandwidth credit grants that may be implemented by packet processing logic (e.g., as part of the ingress logic, such as in the IPS 318 or ITM 314) in hardware, software, or both. The logic determines a system credit pool (702). From the system credit pool, the logic allocates accelerated credits (704). In other words, the logic allocates system credits from the system credit pool as accelerated credits that pre-allocate bandwidth for a destination (e.g., prior to receipt of a data packet, such as at initialization time, or when a traffic flow ends and prior to the next traffic flow).

A network flow begins with the receipt of a data packet (706). The logic 700 analyzes the address information in the header of the data packet (708) to determine a destination for the data packet (710).

Before sending the data packet to the destination, the logic checks whether sufficient bandwidth credit exists (712). The logic determines whether sufficient system credits exist to communicate the data packet to the destination. If so, the logic 700 consumes the amount of system credit needed to cover the packet size, and sends the data packet to the destination (714). Even when there is not sufficient system credit, the logic may determine whether sufficient accelerated credits exist for the destination in order to cover the packet size. If so, the logic may consume the accelerated credits and send the data packet to the destination (716). Consumed accelerated credits may be returned to the system credit pool, or maintained in the accelerated credit pool (possibly reassigned to a destination, or awaiting reassignment to a destination). In other words, the logic determines that insufficient system credits have been received for bandwidth of the destination, but nevertheless sends the data packet to the destination when sufficient accelerated credits are available for the bandwidth of the output port.

In addition, the logic 700 may send a flow status message to the destination (718). The flow status message may inform the destination that a new network flow is beginning. The flow status message may request system bandwidth credits for sending additional packets to the destination. The logic 700 may replenish the accelerated credit pool with additional accelerated credits after the traffic flow ends. As one example, the accelerated credits may be assigned to specific VOQs in the ingress logic, and the accelerated credits may be replenished when the VOQ goes inactive after being active.

The techniques described above help reduce or eliminate the experienced control loop delay, particularly when network flows start, and queues transition from inactive to active. The transition from active to inactive may happen rarely, comparatively speaking, but given the possibly immense number of traffic recipients, even rare events can impact significant numbers of recipients.

The methods, devices, and logic described above may be implemented in many different ways in many different combinations of hardware, software or both hardware and software. For example, all or parts of the ingress logic and egress logic may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
 beginning to receive a data packet at an input port, the data packet comprising a header and a payload;
 as the data packet is received, determining from the header an output port for the payload, the determination of the output port extending in time for a port determination period;
 where the determination period runs during reception of the data packet at the input port; and
 after determining the output port and prior to receiving the payload in full, sending a flow status message to the output port, the flow status message specifying availability of the data packet for the output port.

2. The method of claim 1, further comprising:
 receiving a bandwidth credit for bandwidth of the output port in response to the flow status message.

3. The method of claim 2, further comprising:
 after the packet is received in full, communicating the packet to the output port.

4. The method of claim 1, further comprising:
 receiving the packet in full;
 storing the packet in full in a buffer in communication with the input port; and
 awaiting bandwidth credit for bandwidth of the output port before communicating the packet in full to the output port.

5. The method of claim 1, further comprising:
 issuing bandwidth credit for bandwidth of the output port at a credit rate that is greater than line bandwidth of the output port.

6. The method of claim 5, further comprising:
 monitoring an output port buffer associated with the output port for congestion; and
 when congestion is detected, reducing the credit rate.

7. The method of claim 1, further comprising:
 storing the data packet in an input buffer prior to sending the data packet to the output port;
 associating the data packet in the input buffer with a virtual output queue (VOQ); and
 where the flow status message further specifies the VOQ.

8. The method of claim 1, further comprising:
 sending the flow status message prior to receiving the header in full.

9. A device comprising:
an input port;
an output port;
a switching fabric between the input port and the output port; and
packet processing circuitry in communication with the input port, the packet processing circuitry configured to:
  receive a data packet at the input port, the data packet comprising a header and a payload;
  determine from the header that the data packet destination is the output port, the packet processing circuitry configured to determine the data packet destination within a port determination period during reception of the data packet at the input port; and
  before fully receiving the data packet, sending a flow status message to the output port, the flow status message advising the output port that the data packet is available.

10. The device of claim 9, where the packet processing circuitry is further configured to send the flow status message through the switching fabric.

11. The device of claim 9, where the flow status message specifies a virtual output queue with which the data packet is associated.

12. The device of claim 9, where the packet processing circuitry is further configured to send the flow status message before receiving the header in full.

13. The device of claim 9, further comprising:
an input buffer in communication with the input port in which the data packet is stored; and
where the packet processing circuitry is further configured to:
  await reception of bandwidth credit for bandwidth of the output port to communicate the data packet to the output port.

14. The device of claim 13, where the packet processing circuitry is further configured to:
associate the data packet with a virtual output queue (VOQ); and where the flow status message specifies the VOQ.

15. The device of claim 9, where the packet processing circuitry is further configured to:
receive bandwidth credit for the output port at a credit rate that exceeds line bandwidth of the output port.

16. A device comprising:
an input port;
an output port;
a switching fabric between the input port and the output port; and
packet processing circuitry in communication with the input port, the packet processing circuitry configured to:
  determine a system credit pool;
  receive a data packet at the input port;
  allocate system credits from a system credit pool as accelerated credits that pre-allocate bandwidth for the output port prior to receipt of the data packet; and
  determine that insufficient system credits have been received for bandwidth of the output port, but nevertheless send the data packet to the output port when sufficient accelerated credits are available for the bandwidth of the output port.

17. The device of claim 16, where the packet processing circuitry is further configured to:
allocate the accelerated credits prior to receipt of the data packet.

18. The device of claim 16, further comprising:
an input buffer that stores the data packet associated with an output queue; and
where the packet processing circuitry is configured to:
allocate the accelerated credits to the output queue when the output queue is inactive.

19. The device of claim 18, where the packet processing circuitry is configured to:
replenish the output queue with additional accelerated credits after the output queue goes inactive after being active.

20. The device of claim 16, where the packet processing circuitry is configured to:
determine from the data packet that the data packet is destined for the output port;
send a flow status message to the output port, the flow status message advising the output port that the data packet is available; and
receive a bandwidth credit from the system credit pool for bandwidth of the output port after having sent the data packet to the output port.

\* \* \* \* \*